(12) United States Patent
Kim

(10) Patent No.: US 6,327,602 B1
(45) Date of Patent: Dec. 4, 2001

(54) INVERSE DISCRETE COSINE TRANSFORMER IN AN MPEG DECODER

(75) Inventor: Young-No Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/287,367

(22) Filed: Apr. 7, 1999

(30) Foreign Application Priority Data

Jul. 14, 1998 (KR) ................................................ 98-28304

(51) Int. Cl.[7] .................................................. G06F 17/14
(52) U.S. Cl. ........................................... 708/401; 708/402
(58) Field of Search ..................... 708/401, 402

(56) References Cited

U.S. PATENT DOCUMENTS

| | | |
|---|---|---|
| 5,029,122 | 7/1991 | Uetani . |
| 5,596,518 * | 1/1997 | Toyokura et al. ............... 708/402 |
| 5,671,169 * | 9/1997 | Huang ................................. 708/402 |
| 5,995,990 * | 10/1999 | Henry ................................. 708/402 |
| 6,167,092 * | 12/2000 | Lengwehasatit ................... 708/402 |
| 6,185,595 * | 2/2001 | Hori et al. .......................... 708/402 |

* cited by examiner

*Primary Examiner*—Tan V. Mai
(74) *Attorney, Agent, or Firm*—Birch, Stewart, Kolasch & Birch, LLP

(57) ABSTRACT

An invention about inverse discrete cosine transformer of MPEG decoder is disclosed. By using the symmetry of N×N IDCT kernel matrix, the invention reduces the number of multipliers to N/4, the number of accumulators to N/2 in IDCT block without loss of decoding speed. This invention include memory parts, N/4 multipliers, M/2 accumulators and transposing means. Memory parts store absolute values of kernel matrix of inverse discrete cosine transform. N/4 multipliers receive elements of discrete cosine transform coefficient matrix or of transpose matrix of one-dimensional inverse discrete cosine transform coefficient matrix, as their multiplicand input, and elements of kernel matrix of inverse discrete cosine transform as their multiplier input. N/2 accumulators accumulate data outputted from multiplier. Transposing means transpose data outputted from accumulator and output one-dimensional inverse discrete cosine transform coefficient matrix or two-dimensional inverse discrete cosine transform coefficient matrix. The effects of this invention is the reduction of hardware size due to reducing the number of multipliers and accumulators. Also, in spite of the reduction of hardware size, this invention satisfies the resolution and operational speed requirements of MP@ML and CCIR 601 of MPEG2.

23 Claims, 16 Drawing Sheets

$$Y = \frac{1}{2} C \cdot X$$

where $$X = \begin{bmatrix} X_{00} & X_{01} & X_{02} & X_{03} & X_{04} & X_{05} & X_{06} & X_{07} \end{bmatrix}$$

$$C = \begin{bmatrix} a & b & c & d & a & e & f & g \\ a & d & f & -g & -a & -b & -c & -e \\ a & e & -f & -c & -a & g & b & d \\ a & g & -c & -b & a & d & -f & -e \\ a & -g & -c & b & a & -d & -f & e \\ a & -e & -f & c & -a & -g & b & -d \\ a & -d & f & g & -a & b & -c & e \\ a & -b & c & -d & a & -e & f & -g \end{bmatrix}$$

$$Y = \begin{bmatrix} Y_{00} & Y_{01} & Y_{02} & Y_{03} & Y_{04} & Y_{05} & Y_{06} & Y_{07} \end{bmatrix}$$

FIG. 4a (1)
$$\begin{bmatrix} Y_{00} \\ Y_{01} \\ Y_{02} \\ Y_{03} \end{bmatrix} = 1/2 \begin{bmatrix} a & c & a & f \\ a & f & -a & -c \\ a & -f & -a & c \\ a & -c & a & -f \end{bmatrix} \begin{bmatrix} X_{00} \\ X_{02} \\ X_{04} \\ X_{06} \end{bmatrix} + 1/2 \begin{bmatrix} b & d & e & g \\ d & -g & -b & -e \\ e & -b & g & d \\ g & -e & d & -b \end{bmatrix} \begin{bmatrix} X_{01} \\ X_{03} \\ X_{05} \\ X_{07} \end{bmatrix} = 1/2 \begin{bmatrix} A_0 \\ A_1 \\ A_2 \\ A_3 \end{bmatrix} + 1/2 \begin{bmatrix} B_0 \\ B_1 \\ B_2 \\ B_3 \end{bmatrix}$$

$$Y' \qquad C' \qquad X' \qquad C'' \qquad X'' \qquad A \qquad B$$

(2)
$$\begin{bmatrix} Y_{04} \\ Y_{05} \\ Y_{06} \\ Y_{07} \end{bmatrix} = 1/2 \begin{bmatrix} a & c & a & f \\ a & f & -a & -c \\ a & -f & -a & c \\ a & -c & a & -f \end{bmatrix} \begin{bmatrix} X_{00} \\ X_{02} \\ X_{04} \\ X_{06} \end{bmatrix} - 1/2 \begin{bmatrix} b & d & e & g \\ d & -g & -b & -e \\ e & -b & g & d \\ g & -e & d & -b \end{bmatrix} \begin{bmatrix} X_{01} \\ X_{03} \\ X_{05} \\ X_{07} \end{bmatrix} = 1/2 \begin{bmatrix} A_0 \\ A_1 \\ A_2 \\ A_3 \end{bmatrix} - 1/2 \begin{bmatrix} B_0 \\ B_1 \\ B_2 \\ B_3 \end{bmatrix}$$

$$Y'' \qquad C' \qquad X' \qquad C'' \qquad X'' \qquad A \qquad B$$

FIG. 4b $Y_{00}=A_0+B_0$    $Y_{01}=A_1+B_1$    $Y_{02}=A_2+B_2$    $Y_{03}=A_3+B_3$ $Y_{04}=A_0-B_0$    $Y_{05}=A_1-B_1$    $Y_{06}=A_2-B_2$    $Y_{07}=A_3-B_3$ $A_0=(a \cdot X_{00})+(c \cdot X_{02})+(a \cdot X_{04})+(f \cdot X_{06})$ $A_1=(a \cdot X_{00})+(f \cdot X_{02})+(-a \cdot X_{04})+(-c \cdot X_{06})=(a \cdot X_{00})+(f \cdot X_{02})-(a \cdot X_{04})-(c \cdot X_{06})$ $A_2=(a \cdot X_{00})+(-f \cdot X_{02})+(-a \cdot X_{04})+(c \cdot X_{06})=(a \cdot X_{00})-(f \cdot X_{02})-(a \cdot X_{04})+(c \cdot X_{06})$ $A_3=(a \cdot X_{00})+(-c \cdot X_{02})+(a \cdot X_{04})+(-f \cdot X_{06})=(a \cdot X_{00})-(c \cdot X_{02})+(a \cdot X_{04})-(f \cdot X_{06})$ $B_0=(b \cdot X_{01})+(d \cdot X_{03})+(e \cdot X_{05})+(g \cdot X_{07})$ $B_1=(d \cdot X_{01})+(-g \cdot X_{03})+(-b \cdot X_{05})+(-e \cdot X_{07})=(d \cdot X_{01})-(g \cdot X_{03})-(b \cdot X_{05})-(e \cdot X_{07})$ $B_2=(e \cdot X_{01})+(-b \cdot X_{03})+(g \cdot X_{05})+(d \cdot X_{07})=(e \cdot X_{01})-(b \cdot X_{03})+(g \cdot X_{05})+(d \cdot X_{07})$ $B_3=(g \cdot X_{01})+(-e \cdot X_{03})+(d \cdot X_{05})+(-b \cdot X_{07})=(g \cdot X_{01})-(e \cdot X_{03})+(d \cdot X_{05})-(b \cdot X_{07})$

FIG. 4c $$Y = \begin{array}{|c|c|c|c|c|c|c|c|} \hline Y_{70} & Y_{71} & Y_{72} & Y_{73} & Y_{74} & Y_{75} & Y_{76} & Y_{77} \\ \hline Y_{60} & Y_{61} & Y_{62} & Y_{63} & Y_{64} & Y_{65} & Y_{66} & Y_{67} \\ \hline Y_{50} & Y_{51} & Y_{52} & Y_{53} & Y_{54} & Y_{55} & Y_{56} & Y_{57} \\ \hline Y_{40} & Y_{41} & Y_{42} & Y_{43} & Y_{44} & Y_{45} & Y_{46} & Y_{47} \\ \hline Y_{30} & Y_{31} & Y_{32} & Y_{33} & Y_{34} & Y_{35} & Y_{36} & Y_{37} \\ \hline Y_{20} & Y_{21} & Y_{22} & Y_{23} & Y_{24} & Y_{25} & Y_{26} & Y_{27} \\ \hline Y_{10} & Y_{11} & Y_{12} & Y_{13} & Y_{14} & Y_{15} & Y_{16} & Y_{17} \\ \hline Y_{00} & Y_{01} & Y_{02} & Y_{03} & Y_{04} & Y_{05} & Y_{06} & Y_{07} \\ \hline \end{array}$$

FIG. 8a $$Y^T = \begin{bmatrix}
Y_{00} & Y_{10} & Y_{20} & Y_{30} & Y_{40} & Y_{50} & Y_{60} & Y_{70} \\
Y_{01} & Y_{11} & Y_{21} & Y_{31} & Y_{41} & Y_{51} & Y_{61} & Y_{71} \\
Y_{02} & Y_{12} & Y_{22} & Y_{32} & Y_{42} & Y_{52} & Y_{62} & Y_{72} \\
Y_{03} & Y_{13} & Y_{23} & Y_{33} & Y_{43} & Y_{53} & Y_{63} & Y_{73} \\
Y_{04} & Y_{14} & Y_{24} & Y_{34} & Y_{44} & Y_{54} & Y_{64} & Y_{74} \\
Y_{05} & Y_{15} & Y_{25} & Y_{35} & Y_{45} & Y_{55} & Y_{65} & Y_{75} \\
Y_{06} & Y_{16} & Y_{26} & Y_{36} & Y_{46} & Y_{56} & Y_{66} & Y_{76} \\
Y_{07} & Y_{17} & Y_{27} & Y_{37} & Y_{47} & Y_{57} & Y_{67} & Y_{77}
\end{bmatrix}$$

FIG. 8b $$X^T \cdot C = \frac{1}{2} Y^T$$

where $$X^T = \begin{bmatrix} X_{00} & X_{01} & X_{02} & X_{03} & X_{04} & X_{05} & X_{06} & X_{07} \end{bmatrix}$$

$$C = \begin{bmatrix} a & b & c & d & e & f & g \\ a & d & f & -g & -c & -a & -b & -e \\ a & e & -g & -b & -a & -c & f & d \\ a & g & -c & -a & g & c & -a & -b \\ a & -g & -c & a & b & -d & -e & f & -b \\ a & -e & b & -d & -g & c & -f & e \\ a & -b & e & -c & f & -a & d & -g \end{bmatrix}$$

$$Y^T = \begin{bmatrix} Y_{00} & Y_{10} & Y_{20} & Y_{30} & Y_{40} & Y_{50} & Y_{60} & Y_{70} \end{bmatrix}$$

FIG. 9a (1)
$$\begin{bmatrix} X_{00} \\ X_{01} \\ X_{02} \\ X_{03} \end{bmatrix} = 1/2 \begin{bmatrix} a & c & a & f \\ a & f & -a & -c \\ a & -f & -a & c \\ a & -c & a & -f \end{bmatrix} \begin{bmatrix} Y_{00} \\ Y_{20} \\ Y_{40} \\ Y_{60} \end{bmatrix} + 1/2 \begin{bmatrix} b & d & e & g \\ d & -g & -b & -e \\ e & -b & g & d \\ g & -e & d & -b \end{bmatrix} \begin{bmatrix} Y_{10} \\ Y_{30} \\ Y_{50} \\ Y_{70} \end{bmatrix} \begin{bmatrix} D_0 \\ D_1 \\ D_2 \\ D_3 \end{bmatrix} + 1/2 \begin{bmatrix} E_0 \\ E_1 \\ E_2 \\ E_3 \end{bmatrix}$$

(2)
$$\begin{bmatrix} X_{04} \\ X_{05} \\ X_{06} \\ X_{07} \end{bmatrix} = 1/2 \begin{bmatrix} a & c & a & f \\ a & f & -a & -c \\ a & -f & -a & c \\ a & -c & a & -f \end{bmatrix} \begin{bmatrix} Y_{00} \\ Y_{20} \\ Y_{40} \\ Y_{60} \end{bmatrix} - 1/2 \begin{bmatrix} b & d & e & g \\ d & -g & -b & -e \\ e & -b & g & d \\ g & -e & d & -b \end{bmatrix} \begin{bmatrix} Y_{10} \\ Y_{30} \\ Y_{50} \\ Y_{70} \end{bmatrix} \begin{bmatrix} D_0 \\ D_1 \\ D_2 \\ D_3 \end{bmatrix} - 1/2 \begin{bmatrix} E_0 \\ E_1 \\ E_2 \\ E_3 \end{bmatrix}$$

FIG. 9b $$x = \begin{bmatrix} x_{00} & x_{10} & x_{20} & x_{30} & x_{40} & x_{50} & x_{60} & x_{70} \\ x_{01} & x_{11} & x_{21} & x_{31} & x_{41} & x_{51} & x_{61} & x_{71} \\ x_{02} & x_{12} & x_{22} & x_{32} & x_{42} & x_{52} & x_{62} & x_{72} \\ x_{03} & x_{13} & x_{23} & x_{33} & x_{43} & x_{53} & x_{63} & x_{73} \\ x_{04} & x_{14} & x_{24} & x_{34} & x_{44} & x_{54} & x_{64} & x_{74} \\ x_{05} & x_{15} & x_{25} & x_{35} & x_{45} & x_{55} & x_{65} & x_{75} \\ x_{06} & x_{16} & x_{26} & x_{36} & x_{46} & x_{56} & x_{66} & x_{76} \\ x_{07} & x_{17} & x_{27} & x_{37} & x_{47} & x_{57} & x_{67} & x_{77} \end{bmatrix}$$

FIG. 11b

INVERSE DISCRETE COSINE TRANSFORMER IN AN MPEG DECODER

FIELD OF THE INVENTION

The present invention relates to an inverse discrete cosine transforming apparatus in an MPEG decoder, more particularly to an inverse discrete cosine transforming apparatus for carrying out an inverse discrete cosine transform(IDCT) of a 8×8 data block, which is satisfied by the MP@ML requirements of an MPEG(Moving Picture Experts Group) and CCIR 601 specification.

BACKGROUND OF THE RELATED ART

MPEG is a name of an international organization for standardization of digital signal compression. Although they started discussing about MPEG in 1988, just a few experts recognized the term until the research of HDTV were activated in early 90's.

Today, realizing devices using MPEG moving picture compressing method such as DVD, digital TV, the term MPEG became common. In this multimedia era, anyone with a little interests in the field easily can hear or see the term, MPEG.

The MPEG became a widely known international standard, and it is remarkably succeeded in digital video signal processing rather than digital audio signal processing. There are existing one-chip MPEG decoders, and more various compressed moving picture media using MPEG compressing method will be developed. are existing one-chip MPEG decoders, and more various compressed moving picture media using MPEG compressing method will be developed.

FIG. 1 is a block diagram showing a decoding process of a MPEG decoder.

In variable length decoding (101), variable length coded DCT coefficient(Discrete Cosine Transform coefficient) is decoded.

Inverse scanning (102) is a procedure of converting a decoded one-dimensional DCT coefficient to a two-dimension form using a zig-zag or alternative scanning method. Any other scanning method can be also used.

Inverse quantization(103) is the procedure for getting inverse-quantized DCT coefficients, and includes saturation and mismatch control algorithm. Since MPEG only specifies requirements for decoding, not for encoding, saturation and mismatch control algorithms are meant to prevent accumulation of errors in case of mismatch between DCT of encoder and IDCT of decoder.

DCT coefficients produced in inverse quantization process(103) go through an IDCT process, and are fed to motion compensation process (105). Motion compensation process uses motion vector to improve efficiency of prediction. Motion vector is offset of previous or next reference field or frame.

IDCT of MPEG2 can be expressed in the following equation (1).

$$x(i, j) = \frac{2}{N} \sum_{U=0}^{N-1} \sum_{v=0}^{N-1} C(u)C(v)X(u, v) \cos\frac{(2i+1)u\pi}{2N} \cos\frac{(2j+1)v\pi}{2N}$$

[Equation 1]

-continued $$c(u, v) = \left(\frac{1}{\sqrt{2}} \text{ (if } u, v = 0\text{), } 1\text{(otherwise)}\right)$$

where x(i, j) (i, j=0, 1, 2, . . . , N−1) are pixel data, X(u, v) (u, v=0, 1, 2, . . . , N−1) are inverse quantized DCT coefficients.

In equation 1, $N^4$ multiplications are needed to carry out a two-dimensional IDCT.

Since multiplier takes a lot of space in actual hardware and multiplication takes more clocks, this problem should be required to be solved.

SUMMARY OF THE INVENTION

An object of the present invention is to provide an alternative solution to overcome the above described disadvantages that substantially obviates one or more of the problems caused by limitations and disadvantages of the related arts.

This invention reduces the number of multipliers to N/4 and the number of accumulators to N/2 by using the symmetry property of N×N IDCT kernel matrix without any loss of operation speed.

To achieve the above object and other advantages and in accordance with the purpose of the present invention, as embodied and broadly described, an inverse discrete cosine transformer in an MPEG decoder includes: a memory storing an absolute value of an element of an IDCT kernel matrix; N/4 multipliers having an element of DCT coefficient matrix or transposed one-dimensional DCT coefficient matrix as a multiplicand and an element of the IDCT kernel matrix as a multiplier; N/2 accumulators accumulating outputs of the multipliers; transposing means transposing outputs of the accumulators to generate the one-dimensional IDCT coefficient matrix or a two dimensional IDCT coefficient matrix.

Additional advantages, objects, and features of the invention will be set forth in part in the description which follows and in part will become apparent to those having ordinary skill in the art upon examination of the following or may be learned from practice of the invention. The objects and advantages of the invention maybe realized and attained as particularly pointed out in the appended claims.

BRIEF DESCRIPTION OF THE DRAWINGS

The invention will be described in detail with reference to the following diagrams in which like reference numerals refer to like elements wherein:

FIG. 4(a) is a determinant of one-dimensional IDCT coefficient matrix, Y=C·X;

FIG. 4(b) shows the determinant in FIG. 4(a) is decomposed to two determinants;

FIG. 4(c) shows the determinants in FIG. 4(b) are deployed in an equation form;

FIG. 8(a) is a table of a 8×8 one-dimensional IDCT coefficients, Y;

FIG. 8(b) is a table of a transposed 8×8 one-dimensional IDCT coefficients, YT;

FIG. 9(a) shows a determinant for obtaining 8×1 vector of a transposed two-dimensional IDCT coefficient matrix according to the present invention;

FIG. 9(b) shows the determinant in FIG. 9(a) is decomposed to two determinants;

FIG. 11(b) is a table of a transposed 8×8 two-dimensional IDCT coefficients, x.

DETAILED DESCRIPTION OF PREFERRED EMBODIMENTS

An example of implementation of this invention can be seen in FIGS. 2 to 11 as the following.

First, to reduce number of multiplication, this invention uses row-column decomposition. In this row-column decomposition, a first one-dimensional IDCT is carried out in a column unit, then a second one-dimensional IDCT is carried out in a row unit with the result of the first one-dimensional IDCT. Thereby the row-column decomposition may obtain the same result as the two-dimensional IDCT.

Equation (1) may be expressed with two decomposed one-dimensional IDCT matrices C, X as the following:

$$Y = C \cdot X$$

In other words, one-dimensional IDCT kernel matrix Y is obtained by multiplying orthogonal IDCT kernel matrix C and inverse-quantized DCT coefficient matrix X.

With equations (1) and (2), two-dimensional IDCT kernel matrix X can be defined as the following equation (3).

$$x = C \cdot X \cdot C^T = Y \cdot C^T = (C \cdot Y^T)^T \qquad \text{[Equation 3]}$$

Two-dimensional IDCT kernel matrix x is obtained by performing next steps transposing the one-dimensional IDCT kernel matrix Y first, then multiplying IDCT kernel matrix C and one-dimensional IDCT kernel matrix Y, and transposing the product.

In equation 3, since the DCT kernel matrix C is orthogonal, $C \square^T = I$ is applied, where I is an identity matrix. Equation (3) can be expressed as the following equation (4).]

$$C(k, n) = \sqrt{\frac{2}{N}} \ a(n) \cos \frac{(2k+1)n\pi}{2N} \qquad \text{[Equation 4]}$$

$$a(n) = \left( \frac{1}{\sqrt{2}} \ (\text{if } n = 0), \ 1(\text{otherwise}) \right)$$

According to equation (4), two-dimensional IDCT of N×N data block is obtained by multiplying three N×N matrices. So, it requires $2N^3$ multiplications which is less than equation (1). As a result, two-dimensional IDCT can be decomposed into two one-dimensional IDCT, and each one-dimensional IDCT can be obtained by N times of multiplying N×N matrix and N×1 matrix.

Figure 1:
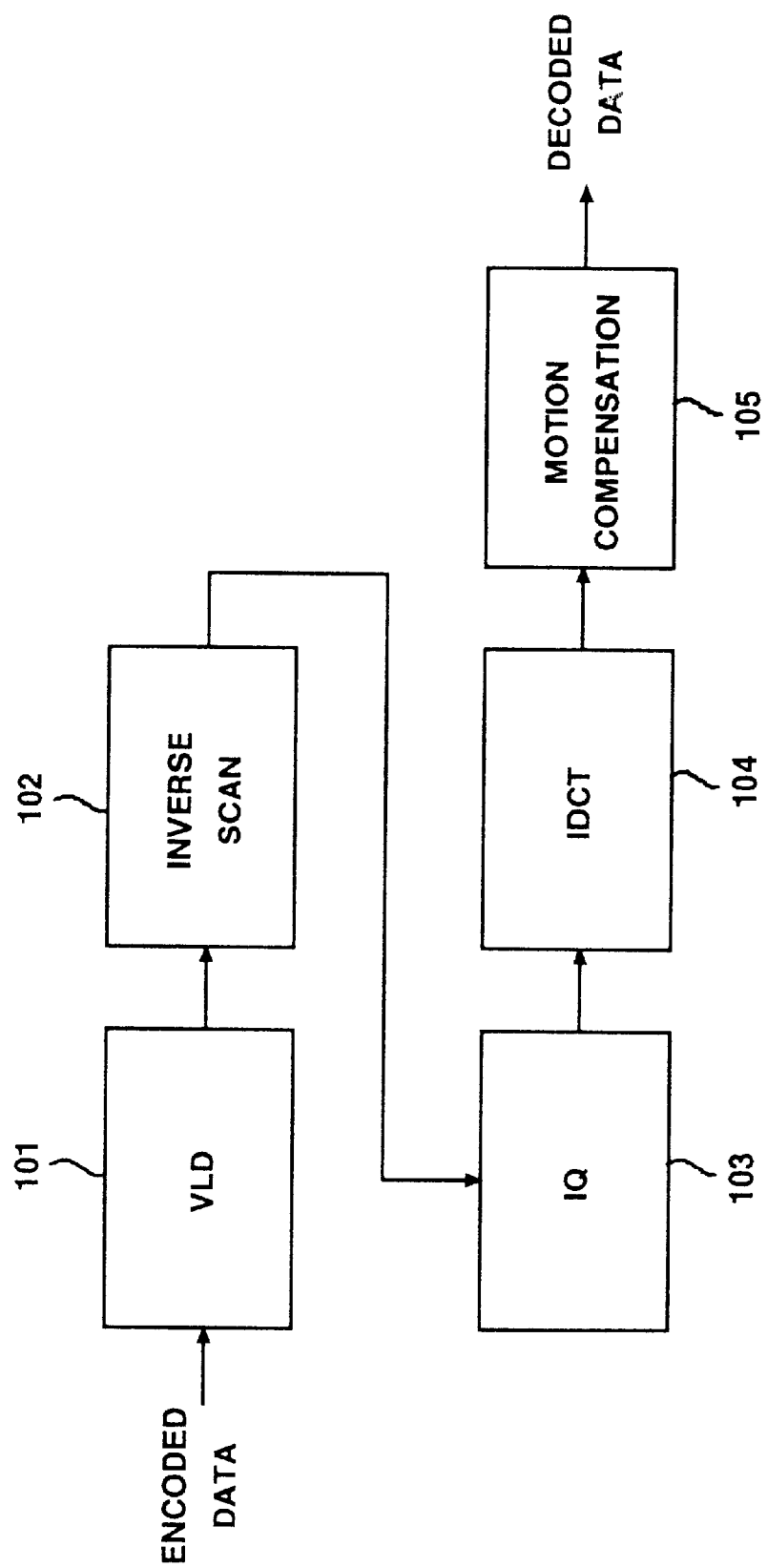
FIG. 1 is a block diagram of decoding process.
Figure 2:
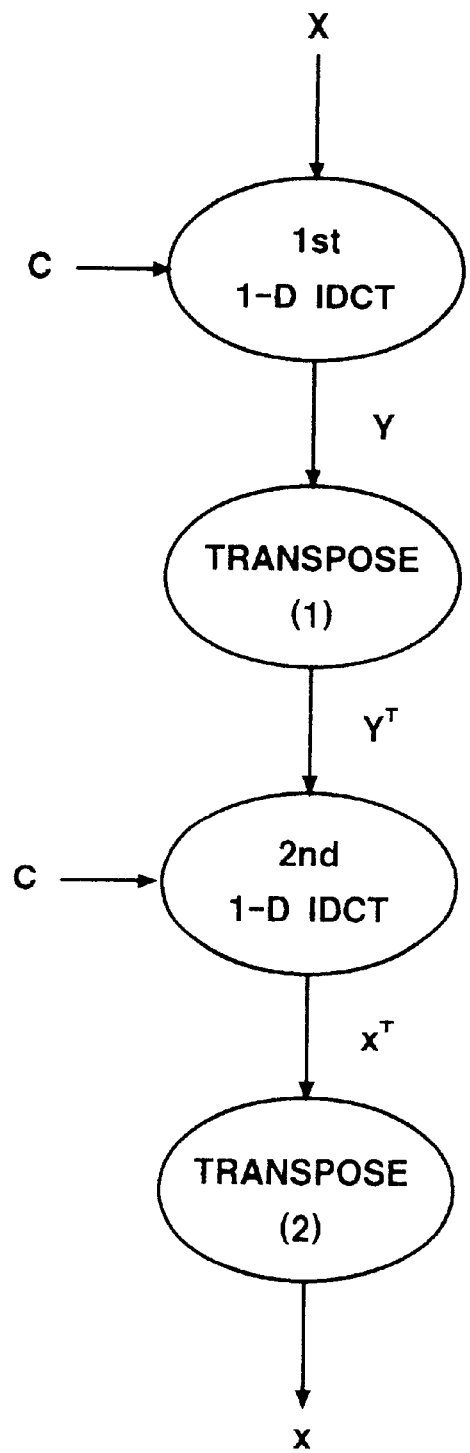
FIG. 2 is a conceptual diagram for carrying out two-dimensional IDCT with two one-dimensional IDCT.

The concept for implementing hardware which computes two-dimensional IDCT with two one-dimensional IDCT is shown in FIG. 2. As shown in FIG. 2, a first one-dimensional IDCT is performed with inverse-quantized DCT coefficient matrix X and IDCT kernel matrix C. $Y^T$ is obtained by transposing the first one-dimensional IDCT matrix Y. A second one-dimensional IDCT is performed with the transposed matrix, $Y^T$ and the IDCT kernel matrix, C. Then a two-dimensional IDCT coefficient matrix, x is obtained by transposing the result of the second one-dimensional IDCT.

According to the concept shown in FIG. 2, two IDCT blocks and two transposing blocks are required. If a hardware can be designed with only one IDCT block and one transposing block, a space is saved.

Figure 3:
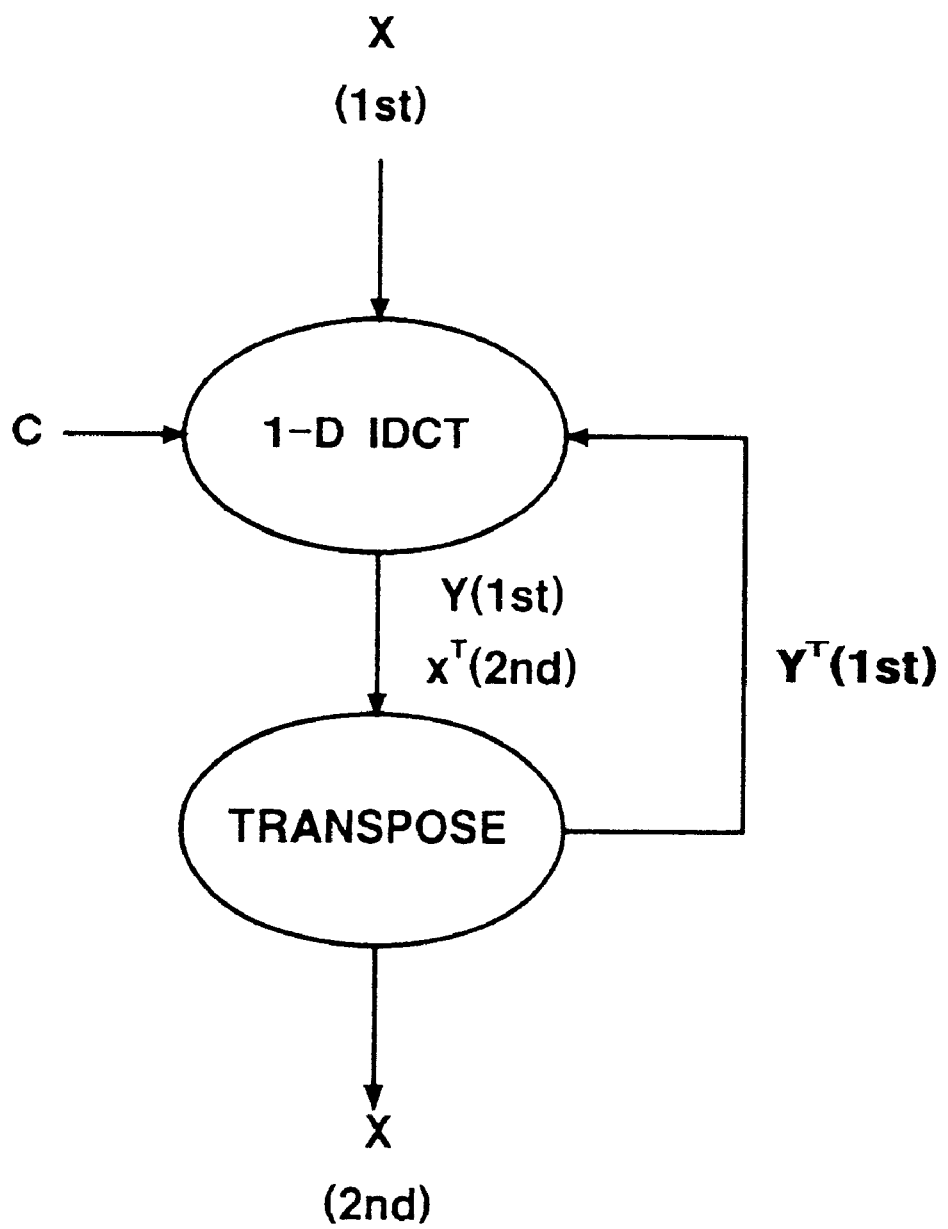
FIG. 3 is a conceptual diagram for forming a hardware with an one- dimensional IDCT block and a transposing block.

The concept of the design with only one IDCT block and one transposing block is shown in FIG. 3. FIG. 3 shows the area of the hardware is reduced by performing the two-dimensional IDCT with one IDCT block and one transposing block.

The first one-dimensional IDCT is performed with the inverse-quantized DCT coefficient matrix, X and IDCT kernel matrix, C. A new matrix $Y^T$ is obtained by transposing the matrix Y. This matrix $Y^T$ is fed back to the one-dimensional IDCT block. A Second one-dimensional IDCT is performed with the fed back matrix $Y^T$ and the IDCT kernel matrix, C. The result of the second IDCT, x is obtained by transposing the result of the second one-dimensional IDCT.

To perform two-dimensional IDCT with only one-dimensional IDCT block as described, one-dimensional IDCT block shall satisfy the following requirements.

Letting operational frequency of one-dimensional IDCT block be 40.5 MHz, the moving picture decoding speed of MP@ML (Main Profile at Main Level) standard can be calculated as the following. Frame transmission speed of NTSC specification is 30 [frames/sec], and the number of pixels required for a frame is 720×480. Since IDCT is performed by the a unit of 8×8 data block in MPEG2, the capacity required for a unit of data block at a given operational frequency is the following.

First, the number of data blocks per unit frame is the following.

$$\frac{720 \ 480 \ [\text{pixel/frame}]}{8 \ 8 \ [\text{pixel/block}]} 1.5 = 8,100 \ [\text{block/frame}] \qquad \text{[Equation 5]}$$

In equation 5, the multiplier, 1.5 is due to the fact that the ratio of brightness signal to contrast signal which are being processed in MPEG decoder is 4:2:0, which have no relation with the actual ratio. In practice, when the ratio of brightness signal to contrast signal in practical picture displayed on the screen is 4:2:2 (CCIR 601), video controller changes it back to 4:2:2 although it might have changed to 4:2:0 in MPEG decoder.

The number of cycles needed for one-dimensional IDCT block to process one 8×8 data block can be calculated by using the following equation.

40.5M [cycle/sec]⅟₃₀[sec/frame]⅟₈₁₀₀[frame/block]166.7[cycle/block] [Equation 6]

As shown in equation 6, one-dimensional IDCT block should process one data block in 166.7 cycles.

But, this constraint is satisfied only when there is no stall at all and when decoding procedure continuously functions.

In practice, there are some stalls due to interfacing with VLD (Variable Length Decoder), motion compensator, etc.

Assuming about 10% loss of cycles due to interface is about 10%, about 150 cycles (166.7×0.9) will be permitted for decoding one data block.

It is generally known that only 20% of picture data which are fed to two-dimensional IDCT block have a non-zero value. Also, data of I-picture have more non-zero values than that of P-picture or B-picture.

If four multipliers and eight accumulators are used and there are input of 8×8 data block per a clock cycle, sixty-four clock cycles are required to transform all 64 data for one data block. Considering two-dimensional IDCT, 128 clock cycles are required.

But, if only non-zero data is accessed and average 40% of input data are non-zero values, the operational cycle needed is (64×0.4)+(64×0.6)=64 cycles. This time requirement satisfies the described requirement of 150 clock cycles. Therefore, if these idle clock cycles are used, it is possible to perform calculation with ½ number of operators, which include 2 multipliers and 4 accumulators.

If ½ number of operators are used, there would be a reduction of operational speed to ½ of full sized unit when processing odd indexed data as described. This means 1.5 times depreciation of a whole performance.

When performing the first one-dimensional IDCT, number of columns per one data block is 8[columns/block]×0.4= 3.2[columns/block], and when performing the second one-dimensional IDCT, the number of rows per one data block is 8[rows/block]×0.6×4.8[rows/block]. Therefore, the number of cycles per one data block for butterfly computation is (3.2+4.8)×2=16 cycles. Herein, since two clock cycles are needed for butterfly computations, the number 2 is multiplied Considering all the factors above, the total clock cycles needed for computing one 8×8 data block can be expressed by the following equation (7).

((64[cycle/block]0.4)+(64[cycle/block]0.6 1.5))+16[cycle/block]= 112[cycle/block]   [Equation 7]

Therefore, the requirement that computation of a 8×8 data block shall be done in 150 cycles is satisfied.

FIG. 4(*a*) shows a matrix equation of one-dimensional IDCT coefficient matrix, Y=C·X. In FIG. 4(*a*), inverse-quantized DCT coefficient matrix, X and one-dimensional coefficient matrix, Y have the structure of 8×8 matrix in practice. Since a 8×8 matrix computational result can be obtained by reiterating a 8×1 matrix computation, the following explanation includes only 8×1 matrix computation.

Each element of IDCT kernel matrix in FIG. 4(*a*) has the following value.

$$a = \cos\frac{\pi}{4}, \quad b = \cos\frac{\pi}{16}, \quad c = \cos\frac{\pi}{8}, \quad d = \cos\frac{3\pi}{16}$$

$$e = \cos\frac{5\pi}{16}, \quad f = \cos\frac{3\pi}{8}, \quad g = \cos\frac{7\pi}{16}$$

In the IDCT kernel matrix C of FIG. 4(*a*), if the signs of elements of each column are not considered, the matrix has the symmetry against dotted line. For an example, in the second column from the left, there is the column, "b, d, e, g, −g, −e, −d, −b" whose elements are symmetrically arranged. Also there is the third column, "c, f, −f, −c, −c, −f, f, c" whose upper 4 elements and lower 4 elements have the symmetry.

If this symmetry property is used, it is possible to decompose the IDCT kernel matrix equation in FIG. 4(*a*) into two separated IDCT kernel equations as shown in FIG. 4(*b*). If we denote the two decomposed matrix, C' and C'' as sub-kernel matrix, the IDCT kernel matrix equation in FIG. 4(*a*) can be expressed as two decomposed equations with sub-kernel matrix, C' and C'', in FIG. 4(*b*).

IDCT sub-kernel matrix, C' has its elements of absolute values of a, c and f, and C'' has elements of absolute values of b, d, e and g. DCT coefficient matrix, X' has elements of even indexed elements of X, $X_{00}$, $X_{02}$, $X_{04}$, $X_{06}$, and X'' has elements of odd indexed elements of X, $X_{01}$, $X_{03}$, $X_{05}$, $X_{07}$.

Algebraic equations equivalent to the matrix equations in FIG. 4(*b*) are shown in FIG. 4(*c*).

In FIG. 4(*c*), elements $Y_{00}$, $Y_{01}$, $Y_{02}$ and $Y_{03}$ are obtained by adding the equally indexed elements of vector A and B, and elements $Y_{04}$, $Y_{05}$, $Y_{06}$ and $Y_{07}$ are obtained by subtracting.

In the elements of vector A, $A_0$ and $A_3$ are computed by adding or subtracting equal values, and $A_1$ and $A_2$ are also computed by adding or subtracting equal values. This is due to the symmetry property of IDCT sub-kernel matrix, C'.

But, each element of vector B has no common factors.

In FIG. 4(*b*), after each element of matrix X' or X'' inputted, it is multiplied with a corresponding column of either C' or C'', and the result is accumulated. When the multiplication and accumulation were repeatedly performed for all the columns of either C' or C'', new 4×1 vector A and B can be computed. When a butterfly computation is carried out with the vector A and B, the final result Y' and Y'' can be computed. Matrix Y' can be computed by adding vector A and B, and matrix Y'' can be computed by subtracting vector B from vector A.

Since matrix C' and C'' has 4 elements, 4 multipliers are needed. But, IDCT sub-kernel matrix, C' has the symmetry for absolute valued elements against the dotted line.

Therefore, by taking out the signs of elements and compensating those signs on accumulation procedure after multiplying only upper two rows of C', the normal multiplication product of DCT coefficient matrix X' or X'' and IDCT sub-kernel matrix C' or C'' may be obtained.

But, since the other sub-kernel matrix C'' which has the elements of b, d, e and g is does not have symmetry property, it is essential to use four multipliers. But, when multiplying non-symmetrical IDCT sub-kernel matrix, C' and DCT coefficient matrix, X'', it is possible to compute the equation in FIG. 4(*b*) with only 2 multipliers if each element of the matrix X'' is accessed repeatedly for two cycles.

But, the hardware design with two multipliers using this method has the ½ of speed compared to the hardware design with four multipliers. For a hardware design with two multipliers to be valid, it shall satisfy the condition that the required cycles for computing one data block (8×8) shall not exceed 150 cycles which is previously shown.

Figure 5:
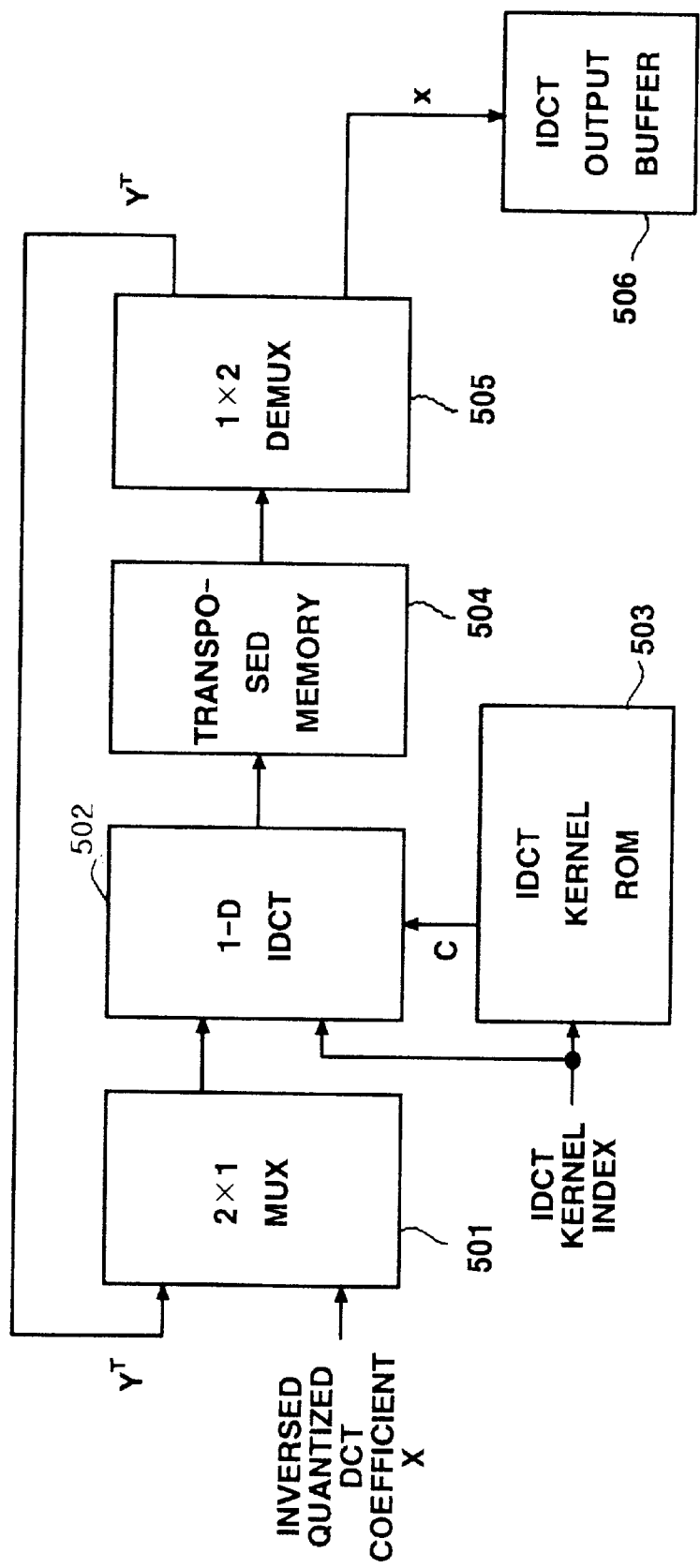
FIG. 5 is a block diagram of a hardware according to FIG. 3.

FIG. 5 is a block diagram for the hardware using concepts in FIG. 3.

Inverse-quantized DCT coefficient matrix, X and transpose matrix, $Y^T$ of one-dimensional IDCT coefficient matrix, Y is inputted to a 2×1 multiplexor (501). When computing the first one-dimensional IDCT, DCT coefficient matrix is selected, and when performing the second one-dimensional IDCT, transpose matrix, $Y^T$ is selected.

The output of multiplexor (501) is fed to one-dimensional IDCT block (502). ROM (503) gets an index of elements of inverse-quantized DCT coefficient matrix, X from multiplexor (501), and feed the elements of IDCT kernel matrix corresponding to the index to one-dimensional IDCT block (502). The first one-dimensional IDCT is performed by multiplying inputted DCT coefficient matrix, X and IDCT kernel matrix, C in one-dimensional IDCT block (502).

When being outputted from transposing means (504), one-dimensional IDCT matrix, Y is transposed to $Y^T$ and fed to 1×2 demultiplexor (505) to become OUTPUT 1 of demultiplexor (505). OUTPUT 1 of demultiplexor (505) is fed back to INPUT 2 of multiplexor (501).

When computing the second one-dimensional IDCT, the output of multiplexor (501) is not inverse-quantized DCT coefficient matrix, X, but transposed matrix, $Y^T$ which is fed back from demultiplexor (505).

The second one-dimensional IDCT computation is performed by multiplying matrix, $Y^T$ and kernel matrix, C in one-dimensional IDCT block (502). The result of two IDCT computations is transposed in transposing memory means (504), and become OUTPUT 2 of demultiplexor (505). The OUTPUT 2 of the demultiplexor(505) is the two-dimensional IDCT matrix, X, which is fed to IDCT output buffer (506).

Figure 6:
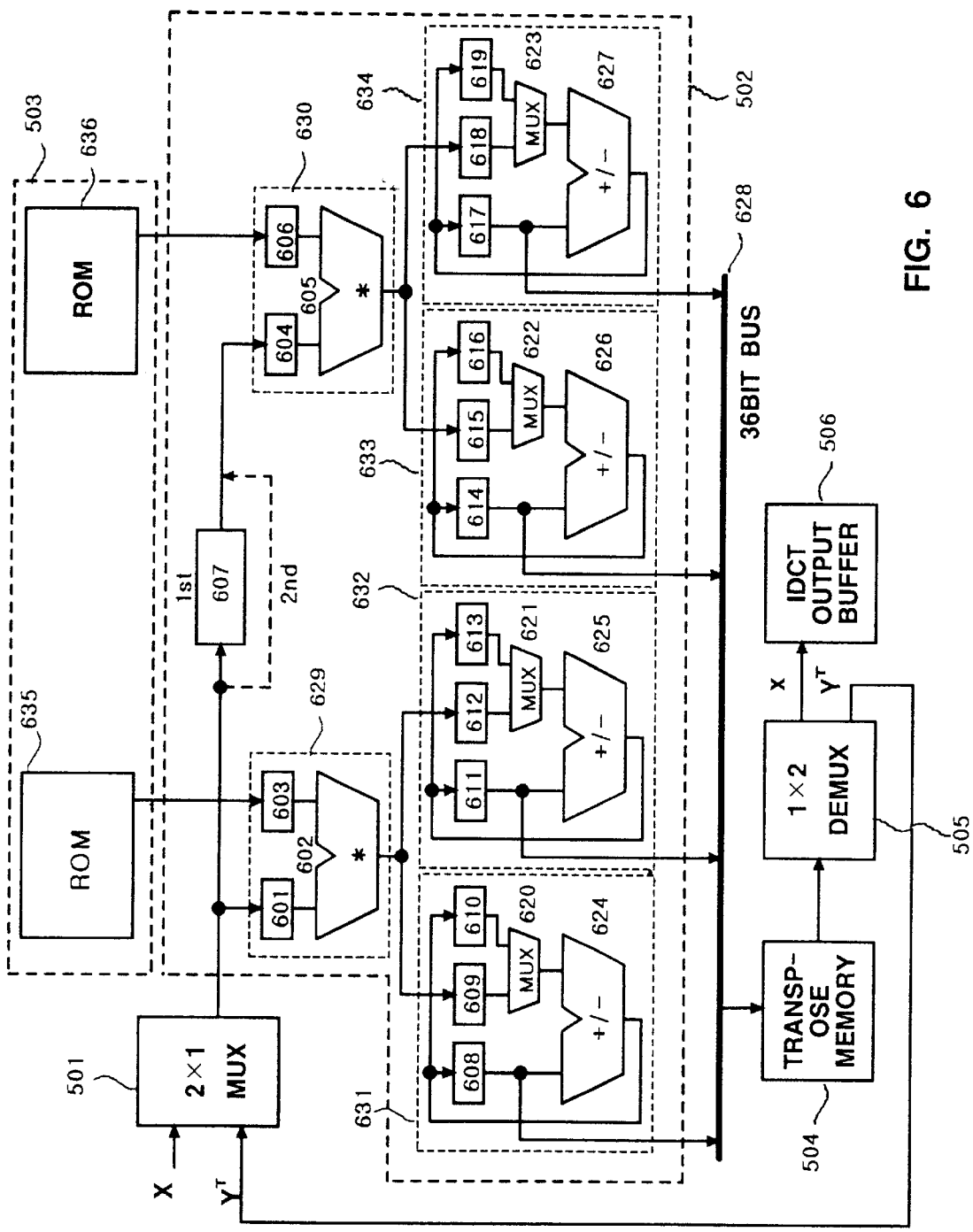
FIG. 6 shows a preferable embodiment for carrying out a two-dimensional IDCT according to the present invention.
Figure 7:
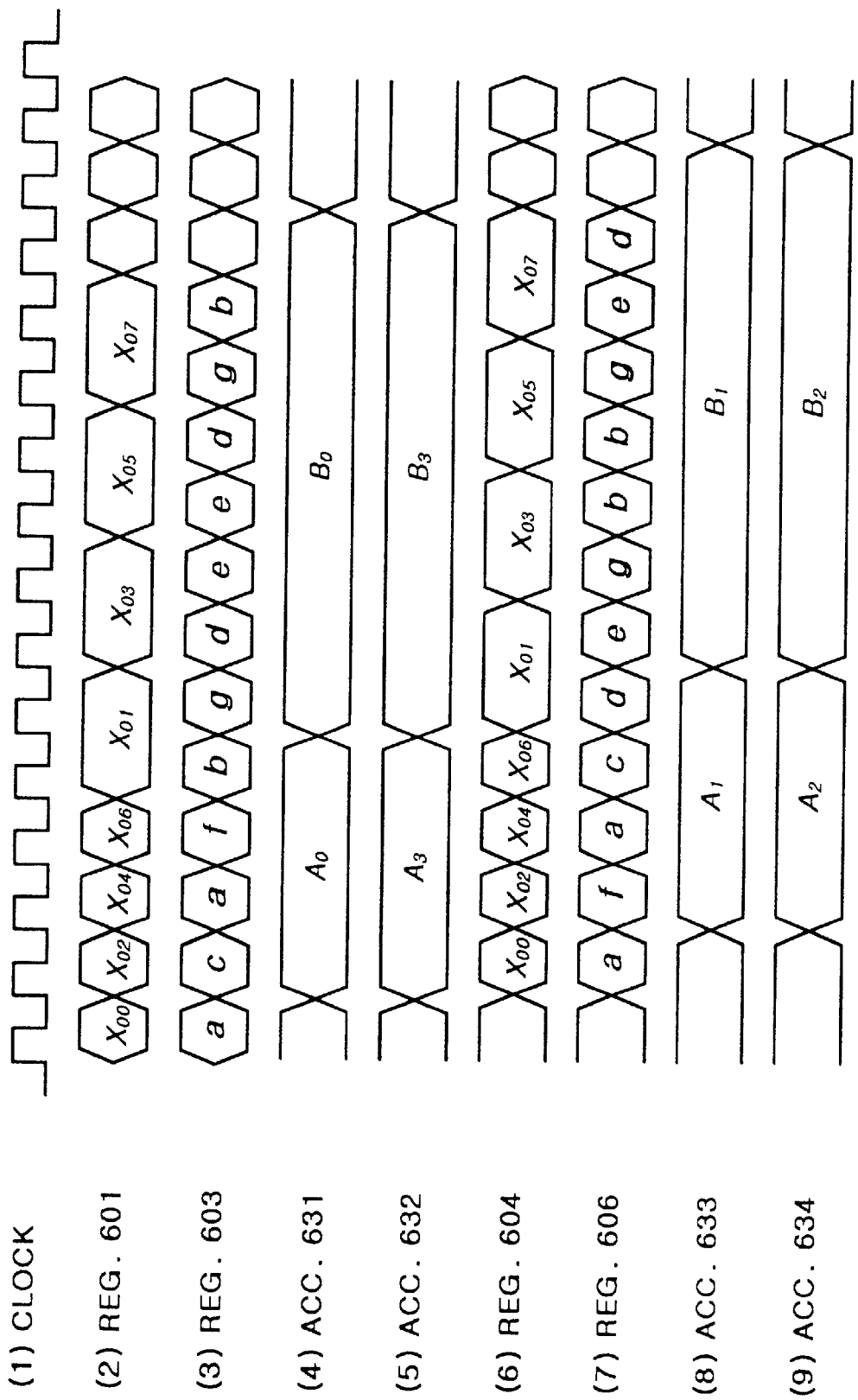
FIG. 7 is a timing diagram of a first one-dimensional IDCT according to the present invention.

FIG. 6 is a block diagram for the hardware implemented for the present invention computing two-dimensional IDCT. It is a detailed diagram for one-dimensional IDCT block (502) in FIG. 5. FIG. 7 is a diagram showing timing waveforms of one-dimensional IDCT operational properties for one-dimensional IDCT block (502) in FIG. 6.

One-dimensional IDCT block (502) in FIG. 6 is a schematic of a hardware for computing matrix equations in 4(b). It is consisted of two multiplying block (629) (630) and four accumulating block (631) (632) (633) (634).

In each multiplying block (629) (630), the output of multiplexor (501) are inputted as multiplicands, and the elements of C' and C", stored in IDCT kernel ROM (635) (636), which are sub-kernel matrixes of IDCT kernel matrix, C, are inputted as multipliers. The output of each multiplying block (629) (630) are separated and fed to four accumulating blocks (631) (632) (633) (634). The output of the first multiplying block is fed to two accumulating blocks (631) (632), and the output of the second multiplying block is fed to other two accumulating blocks (633) (634).

The output of each accumulating blocks (631) (632) (633) (634) are fed to transposing memory block (504) through 36-bit bus line (628).

When computing one-dimensional IDCT, the datum inputted to a transposing memory (504) is a one-dimensional IDCT coefficient matrix, Y(8×8). When this matrix Y is outputted from transposing memory (504), the rows of matrix Y are transposed to columns, and the columns of Y are transposed to rows, and those transposed rows or columns are fed to demultiplexor (505). In other word, one-dimensional IDCT coefficient matrix Y is transposed to a transpose matrix, $Y^T$ in transposing memory (504).

When $Y^T$, a transpose matrix of one-dimensional IDCT coefficient matrix Y, is stored in transposing memory (504) after the computation of the second one-dimensional IDCT, it is stored in the form of $Y^T$, a transpose matrix of two-dimensional IDCT coefficient matrix, x. Therefore, the matrix which is outputted from transposing memory (504) and is inputted to IDCT output buffer (506) through demultiplexor (505), at that time, is two-dimensional IDCT coefficient matrix, x.

The output of multiplexor (501) is inputted to accumulating block (630) through different paths depending on whether the first one-dimensional IDCT was performed or the second one-dimensional IDCT was performed. When the first one-dimensional IDCT was performed, the elements of DCT coefficient matrix, X, which are outputted from multiplexor (501), are inputted to the second multiplying block (630), via register (607), one clock after the input of the first multiplying block (629).

When the second one-dimensional IDCT was performed, the elements of a transpose matrix, $Y^T$, outputted from multiplexor (501), are directly inputted to multiplying block (630) without going through a register (607).

A register (607) is used to delay inputting timing of a multiplicand input of the second multiplying block (630) by one clock cycle, so that the inputting timing of a multiplicand input of the first multiplying block (629) can be ahead by one clock cycle when computing the first one-dimensional IDCT. Therefore, when computing the first one-dimensional IDCT, two multiplying blocks perform multiplication serially with the interval of one clock cycle, and when computing the second one-dimensional IDCT, two multiplying blocks perform multiplication at the same time or parallelly.

When the first one-dimensional IDCT is computed, two multiplying blocks are sequentially activated to minimize the number of the bus lines. Each element of transpose matrix, $Y^T$ which is the result of the first one-dimensional IDCT is composed of 16 bits. Since the result of the first one-dimensional IDCT is produced by accumulating the output from two multiplying blocks, maximum 64-bit data would be in need of 64-bit bus if processed simultaneously.

But, each element of $x^T$, which is the result of the second one-dimensional IDCT, is composed of 9 bits, and maximum 36-bit data would be produced. Therefore, to minimize the number of lines for the bus, two multiplying blocks (629) (630) are sequentially activated so that 64-bit data can be transmitted using 36-bit bus by two times.

Multiplying block (629) includes two registers (601) (603), one for multiplicand input, and the other one for multiplier input. The other multiplying block (630) also includes two registers (604) (606), one for multiplicand input, and one for multiplier input.

When computing the first one-dimensional IDCT, the first multiplying block (629) does required computations for the calculation of $A_0$, $A_3$ of vector A, and $B_0$, $B_3$ of vector B in FIG. 4(b). The first multiplying block (629) multiplies elements of inverse-quantized DCT coefficient matrix X, and of IDCT kernel matrix C which is provided by IDCT kernel ROM (635) corresponding to the index related to the elements, and outputs the result of multiplication to accumulating block (631) (632).

The second multiplying block (630) does required computations for the calculation of $A_1$, $A_2$ of vector A, and $B_1$, $B_2$ of vector B. The second multiplying block (630) multiplies elements of inverse-quantized DCT coefficient matrix X, and of IDCT kernel matrix C which is provided by IDCT kernel ROM (636) corresponding to the index related to the elements, and outputs the result of multiplication to accumulating block (631) (632).

Two IDCT kernel ROM (635) (636) store values corresponding to elements of IDCT kernel Matrix. Signs (+, −) of those elements are decided according to the rows and columns of IDCT kernel matrix. Since the main purpose of the present invention is to reduce the size of circuit, each IDCT kernel ROM (635) (636) only stores the absolute values of elements of IDCT kernel matrix, C, and each register (603)(606) in multiplying blocks (629) (630) controls the signs of those elements to reduce the size of each IDCT kernel ROM (635) (636). The order, which the elements stored in each IDCT kernel ROM (635) (636) are outputted, is decided considering the index of elements of DCT coefficient matrix which are inputted to multiplexor (501).

Each accumulating block (631-634) has the same structure. First, in accumulating block (631), the output of the accumulating block is inputted to 2×1 multiplexor (620) via register (609). The output of this multiplexor (620) is inputted to accumulator (624), and is added with previous accumulated value. The final accumulated values of this accumulator (624) are an element, $A_0$ of vector A and an element, $B_0$ of vector B.

The element, $A_0$ of vector A is stored in register (610) and fed to INPUT 2 of multiplexor (620), and the element, $B_0$ of vector B is stored in register (608). The elements, $A_0$ and $B_0$ stored in registers (608) (610) are being added by accumulator (624), and become $Y_{00}$ which is an element of the first one-dimensional IDCT coefficient matrix, Y.

Similarly, the other accumulating block (632) processes the element, $A_3$ of vector A and the element, $B_3$ of vector B. As mentioned earlier, IDCT sub-kernel matrix C' in FIG. 4(b) has the symmetry against the dotted line, and if this symmetry property is used, we can compute two-dimensional IDCT with only two accumulating blocks.

FIG. 7(2) shows the sequence of data stored in register (601) in FIG. 6. Those data stored in register (601) are elements of DCT coefficient matrix X, which are outputted from multiplexor (501). FIG. 7(3) shows the sequence of data stored in register (603) in FIG. 6. Those data stored in register (603) are the elements of IDCT kernel matrix, C, which are outputted from IDCT kernel ROM (635). For one-dimensional IDCT block (502) in FIG. 6 to compute the matrix equations in FIG. 4(b), the sequences of multiplicand and multiplier input of multiplier (629) must satisfy the order specified in (2) and (3) of FIG. 7.

(6) of FIG. 7 shows the sequence of data stored in register (604) in FIG. 6. Those data are elements of DCT coefficient matrix, X, which were outputted from multiplexor (501) and passed through register (607). (7) of FIG. 7 show the sequence of data stored in register (606) in FIG. 6. Those data are elements of IDCT kernel matrix, C, which were outputted from IDCT kernel ROM. For one-dimensional IDCT block (502) in FIG. 6 to compute the matrix equations in FIG. 4(b), the sequences of multiplicand and multiplier input of multiplier (630) must satisfy the order specified in (6) and (7) of FIG. 7.

Multiplying block (629) multiplies elements of DCT coefficient matrix, X and the elements of IDCT kernel matrix, C in sequence shown in (2) and (3) of FIG. 7. Multiplications are performed in order which data were received. In other words, $X_{00}$, $X_{02}$, $X_{04}$ and $X_{06}$, which are the even indexed elements of DCT coefficient matrix, X, are being multiplied with a, c, a and f, which are the elements of IDCT sub-kernel matrix C'. The even indexed elements of DCT coefficient matrix, X, $X_{00}$, $X_{02}$, $X_{04}$ and $X_{06}$ shall be stored in register (601) for one clock cycle.

But, the odd indexed elements of DCT coefficient matrix, X, $X_{01}$, $X_{03}$, $X_{05}$ and $X_{07}$ shall be stored in register (601) for at least two clock cycles because each of them shall be multiplied with two elements of IDCT sub-kernel matrix, C".

The results of multiplication from multiplying block (629) are inputted to each multiplexors (620) (621) through two registers (609) (612) in each accumulating block (631) (632). Accumulating block (631) accumulates the product of the even indexed element, $X_{00}$, $X_{02}$, $X_{04}$ and $X_{06}$ of DCT kernel matrix, X and the elements, a, c, a and f of IDCT sub-kernel matrix, C', and produce the element, $A_0$ of the vector A. This element, $A_0$ shall be stored in register (610) in accumulating block (631).

At the same time, the other accumulating block (632) accumulates the product of the even indexed elements, $X_{00}$, $X_{02}$, $X_{04}$, and $X_{06}$ of DCT kernel matrix, X and the elements, a, c, a and f of IDCT sub-kernel matrix, C', and produce the element, $A_3$ of the vector A. This element, $A_3$ shall be stored in register (613) in accumulating block (632).

After computing the elements, $A_0$, $A_3$ of the vector A, accumulating block (631) accumulates the product of the odd indexed elements, $X_{01}$, $X_{03}$, $X_{05}$ and $X_{07}$ of DCT kernel matrix, X and the elements, b, d, e and g of IDCT sub-kernel matrix, C'. The result of this addition is the element, $B_0$ of the vector B. The element, $B_0$ of the vector B shall be stored in register (608) in accumulating block (631).

At the same time, the other accumulating block (632) accumulates the product of the odd indexed elements, $X_{01}$, $X_{03}$, $X_{05}$ and $X_{07}$ of DCT kernel matrix, X and the elements, g, e, d and b of IDCT sub-kernel matrix, C", and produce the element, $B_3$ of the vector B. This element, $B_3$ shall be stored in register (611) in accumulating block (632).

After computing the elements, $A_0$, $A_3$ of the vector A and the elements, $B_0$, $B_3$ of the vector B, accumulating block (631) compute the value of the element, $Y_{00}$ of IDCT coefficient matrix, Y by adding $A_0$ and $B_0$. The element, $Y_{00}$ shall be stored in register (608). Element $Y_{04}$ can be obtained by subtracting $B_0$ from $A_0$ in accumulating block (631).

At the same time, accumulating block (632) compute the value of the element, $Y_{03}$ of IDCT coefficient matrix, Y by adding $A_3$ and $B_3$. The element, $Y_{03}$ shall be stored in register (611). Element, $Y_{07}$ can be also obtained by subtracting $B_3$ from $A_3$ accumulating block (632).

The second multiplying block (630) gets the delayed input, which is delayed by one clock cycle. Those inputted data are the elements of DCT coefficient matrix, X and the elements of IDCT kernel matrix, C.

Multiplying block (630) multiplies elements of DCT coefficient matrix, X and the elements of IDCT kernel matrix, C in sequence shown in (6) and (7) of FIG. 7. Multiplication is performed in order which data were received. In other words, $X_{00}$, $X_{02}$, $X_{04}$ and $X_{06}$, which are the even indexed elements of DCT coefficient matrix, X, are being multiplied with a, c, a and f, which are the elements of IDCT sub-kernel matrix C'. The even indexed elements of DCT coefficient matrix, X, $X_{00}$, $X_{02}$, $X_{04}$ and $X_{06}$ shall be stored in register (604) for one clock cycle.

But, the odd indexed elements of DCT coefficient matrix X, $X_{01}$, $X_{03}$, $X_{05}$ and $X_{07}$ shall be stored in register (604) for two clock cycles because each of them shall be multiplied with two elements of IDCT sub-kernel matrix, C".

The results of multiplication from multiplying block (630) are inputted to each multiplexors (622) (623) through two registers (615) (618) in each accumulating block (633) (634). Accumulating block (633) accumulates the product of the even indexed element, $X_{00}$, $X_{02}$, $X_{04}$ and $X_{06}$ of DCT kernel matrix, X and the elements, a, c, a and f of IDCT sub-kernel matrix, C', and produce the element, $A_1$ of the vector A. This element, $A_1$ shall be stored in register (616) in accumulating block (633).

At the same time, the other accumulating block (634) accumulates the product of the even indexed elements, $X_{00}$, $X_{04}$, $X_{06}$ and $X_{08}$ of DCT kernel matrix, X and the elements, a, f, a and c of IDCT sub-kernel matrix, C', and produce the element, $A_2$ of the vector A. This element, $A_2$ shall be stored in register (619) in accumulating block (634).

After computing the elements, $A_1$, $A_2$ of the vector A, accumulating block (633) accumulates the product of the odd indexed elements, $X_{01}$, $X_{03}$, $X_{05}$ and $X_{07}$ of DCT kernel matrix, X and the elements, d, g, b and e of IDCT sub-kernel matrix, C". The result of this addition is the element, B. of the vector B. The element, $B_1$ of the vector B shall be stored in register (614) in accumulating block (633).

At the same time, the other accumulating block (634) accumulates the product of the odd indexed elements, $X_{01}$, $X_{03}$, $X_{05}$ and $X_{07}$ of DCT kernel matrix, X and the elements, e, b, g and d of IDCT sub-kernel matrix, C'', and produce the element, $B_2$ of the vector B. This element, $B_2$ shall be stored in register (617) in accumulating block (634).

After computing the elements, $A_1$, $A_2$ of the vector A and the elements, $B_1$, $B_2$ of the vector B, accumulating block (633) compute the value of the element, $Y_{01}$ of IDCT coefficient matrix, Y by adding $A_1$ and $B_1$. The element, $Y_{01}$ shall be stored in register (614). We can also get the element, $Y_{05}$ by subtracting $B_1$ from $A_1$ in accumulating block (633).

At the same time, accumulating block (634) computes the value of the element, $Y_{02}$ of IDCT coefficient matrix, Y by adding $A_2$ and $B_2$. The element, $Y_{02}$ shall be stored in register (617). Element $Y_{06}$ can be also obtained by subtracting $B_3$ from $A_3$ in accumulating block (634).

As described above, there is one clock interval between the operations in the first multiplying block (629) and the second multiplying block (630). Since the operation is sequentially performed with the delay of one clock cycle, $Y_{00}$ and $Y_{03}$ are outputted from to each accumulating block (631) (632) one clock cycle before $Y_{01}$ and $Y_{02}$ are outputted from each accumulating block (633) (634).

Since we restrict the result of the first one-dimensional IDCT with 16-bit wide, the elements, $Y_{00}$ and $Y_{03}$ are outputted to transposing memory (504) through 36-bit bus, and after one clock cycle, remaining elements, $Y_{01}$ and $Y_{02}$ are outputted to transposing memory (504). By delaying one clock cycle, 64-bit data can be transmitted sequentially through a 32-bit bus.

It is possible to replace 36-bit bus with 64-bit bus instead of using register (607). As described, register (607) was used to decrease the number of bits which a bus shall carry. In order to do that, register (607) let each accumulating block (629) (630) operates sequentially with the delay of one clock cycle so that the each output comes out sequentially. Therefore, if a 64-bit bus is used, there is no need of using register (607). Two accumulating block (629) (630) would be operated synchronously, and 64-bit data would be transmitted through 64-bit bus.

8×1 one-dimensional IDCT coefficient matrix, Y is computed by iterating those operations described above. Since the actual one-dimensional IDCT coefficient has a structure of 8×8, the one-dimensional IDCT coefficient of 8×8 structure is obtained by iterating the above-identical operations eight times. The computed two-dimensional IDCT coefficient matrix shall be stored in transposing memory (504) in FIG. 6.

A complete 8×8 two-dimensional IDCT coefficient matrix is shown in FIG. 8(a).

FIG. 8(a) also shows the order which data is written to and read from transposing memory (504) with the numbers and arrow signs. The elements of 8×1 one-dimensional IDCT coefficient matrix, Y, which are outputted from each accumulating block (631–634) are recorded as columns (↓) of transposing memory (504). But, data are read from transposing memory as rows (→). FIG. 8(b) shows a complete transpose matrix of 8×8 two-dimensional IDCT coefficient matrix, $Y^T$.

FIG. 9(a) shows a matrix equation which computes the second one-dimensional transpose matrix, $x^T$. $x^T$ is computed by multiplying IDCT kernel matrix, C and 8×1 vector, $Y^T$. $Y^T$ is the first vector of transpose matrix of IDCT coefficient matrix. Compared with the matrix equation in FIG. 4(a), two matrixes have the same format. Therefore the equation in FIG. 9(a) can be decomposed into two equations in FIG. 9(b).

Figure 10:
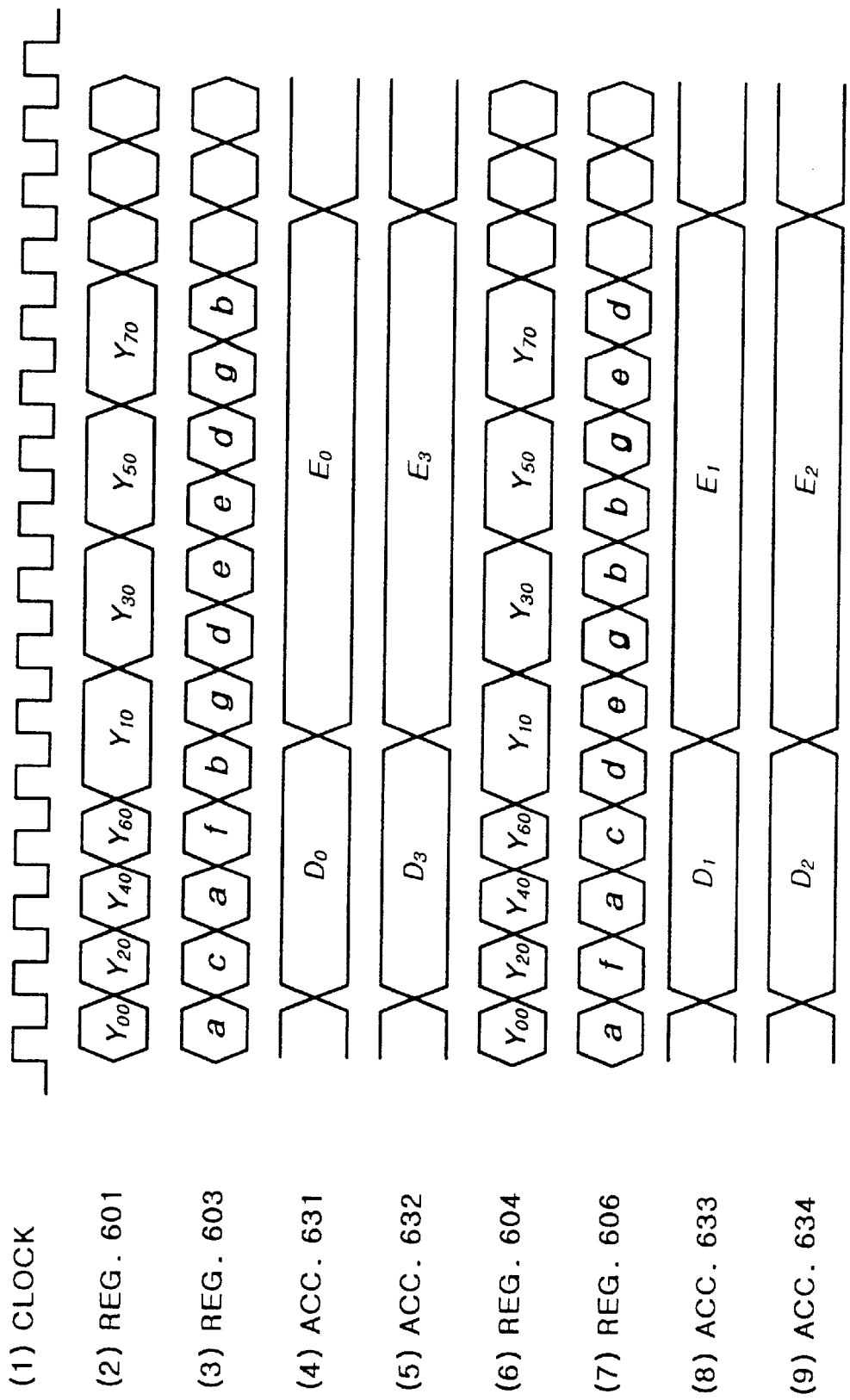
FIG. 10 is a timing diagram of a second one-dimensional IDCT according to the present invention.

FIG. 10 is a diagram showing timing waveforms of the one-dimensional IDCT block (502). FIG. 10 shows timing when it computes the second one-dimensional IDCT matrix equation in FIG. 9(b) using the hardware design implementing this invention in FIG. 6.

The second one-dimensional IDCT computing operations are almost same as the first one-dimensional IDCT computing operations. One difference is that the elements, $Y_{00}$–$Y_{70}$, of transpose matrix of IDCT coefficient matrix, $Y^T$ are inputted instead of $X_{00}$–$X_{07}$, of DCT coefficient matrix, X.

The other difference is that each accumulating block (629) (630) operates synchronously when computing the second one-dimensional IDCT while each accumulating block (629) (630) operates sequentially when computing the first one-dimensional IDCT (Refer to (2) and (3), (6) and (7) of FIG. 10).

Figure 11A:
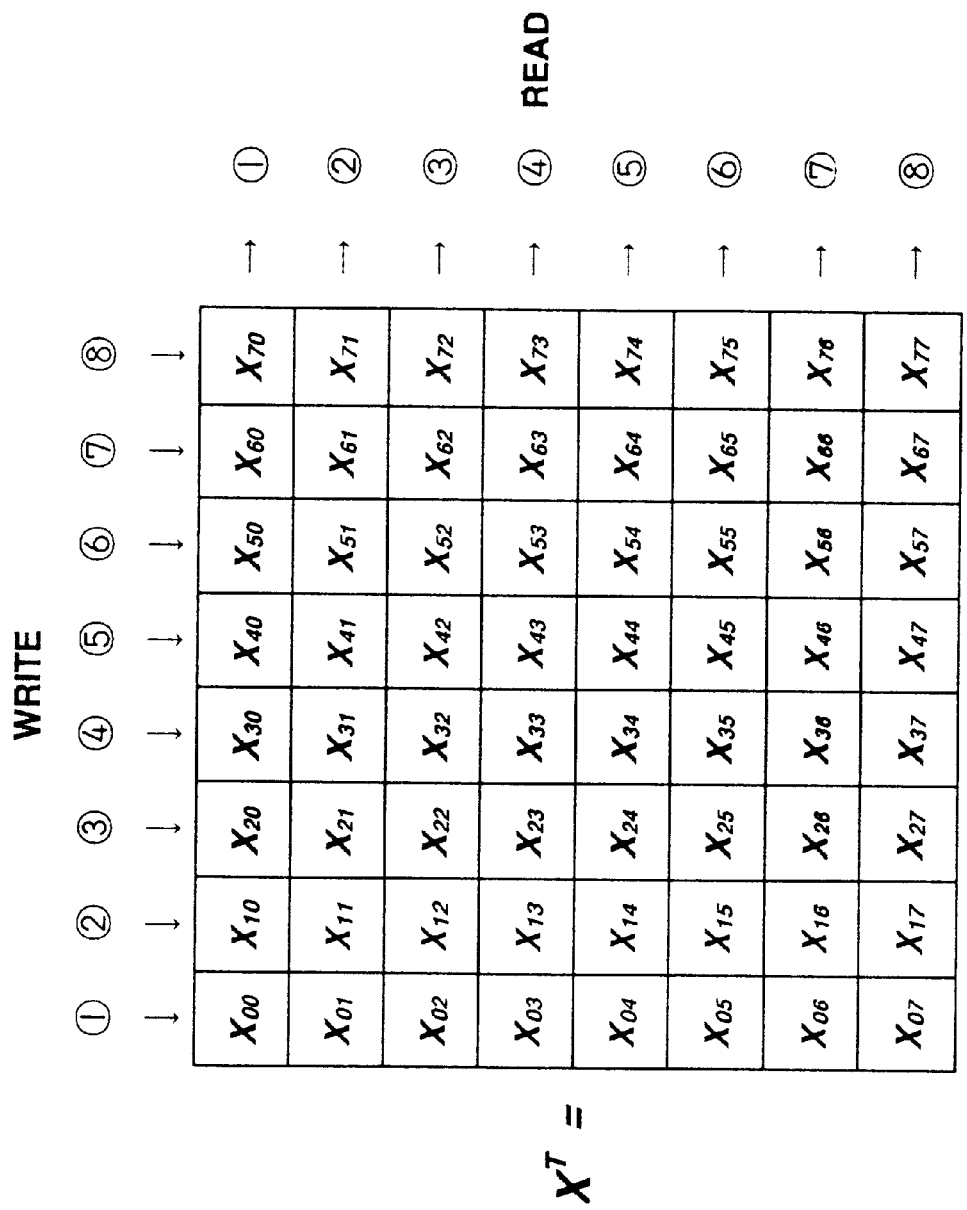
FIG. 11(a) is a table showing a transposed 8×8 two-dimensional IDCT coefficient xT stored in a transposing memory.

FIG. 11(a) shows $x^T$ stored in transposing memory (504), which is the transpose matrix of 8×8 two-dimensional IDCT coefficient matrix. $x^T$ is resulted from the second one-dimensional IDCT computation. When being read from transposing memory (504), $x^T$ is transposed and stored in IDCT output buffer (506) as a complete IDCT coefficient matrix, x.

The effects of this invention is reduction of hardware size by reducing the number of multipliers and accumulators. In spite of the reduction of its hardware size, the present invention satisfies the resolution and operational speed requirements specified in MP@ML and CCIR 601 of MPEG2.

The foregoing embodiments are merely exemplary and are not to be constructed as limiting the present invention. The present teaching can be readily applied to other types of apparatuses. The description of the present invention is intended to be illustrative, and not to limit the scope of the claims. Many alternatives, modifications, and claims, means-plus-function clauses are intended to cover the structures described herein as performing the recited function and not only structural equivalent structures.

What is claimed is:

1. An inverse discrete cosine transforming apparatus in an MPEG decoder for transforming N×N matrix data block comprising:
   a memory storing an absolute value of an element of an IDCT kernel matrix;
   N/4 multipliers having an element of DCT coefficient matrix or transposed one-dimensional DCT coefficient matrix as a multiplicand and an element of said IDCT kernel matrix as a multiplier;
   N/2 accumulators accumulating outputs of said multipliers;
   transposing means transposing outputs of said accumulators to generate said one-dimensional IDCT coefficient matrix or a two-dimensional IDCT coefficient matrix.

2. The inverse discrete cosine transforming apparatus according to claim 1, wherein said multipliers have said element of DCT coefficient matrix when a first one-dimensional IDCT is carried out or said element of transposed one-dimensional IDCT coefficient matrix when a second one-dimensional IDCT is carried out, as said multiplicand, and said element of IDCT kernel matrix as said multiplier.

3. The inverse discrete cosine transforming apparatus according to claim 1, wherein said accumulators accumulate said outputs of the multipliers to generate each element of said DCT coefficient matrix when said first one-dimensional IDCT is carried out, and each element of said transposed two-dimensional IDCT coefficient matrix when said second one-dimensional IDCT is carried out.

4. The inverse discrete cosine transforming apparatus according to claim 1, wherein said multipliers receive said absolute value of the element of IDCT kernel matrix, and give a negative or positive sign to said absolute value during a accumulation stage.

5. The inverse discrete cosine transforming apparatus according to claim 1, wherein said transposing means includes:
  a transposing memory storing said outputs of the multipliers in a matrix form and transposing said stored matrix to generate said element of one-dimensional IDCT coefficient matrix and said element of two-dimensional IDCT coefficient matrix; and
  a demultiplexor supplying said one-dimensional IDCT coefficient matrix to said multipliers and said two-dimensional IDCT coefficient matrix to an external device.

6. An inverse discrete cosine transforming apparatus in an MPEG decoder for transforming N×N matrix data block comprising:
  an IDCT kernel storing means storing value of an IDCT kernel, and being applied an element of a DCT coefficient matrix or transposed one-dimensional IDCT coefficient matrix to output said IDCT kernel corresponding to the index of said element;
  a first multiplying means receiving said element of the DCT coefficient matrix when a first one-dimensional IDCT is carried out, and said transposed element of the IDCT kernel when a second one-dimensional IDCT is carried out, as a first multiplicand, and said element of the IDCT kernel outputted from said IDCT kernel storing means as a first multiplier;
  a second multiplying means receiving said element of the DCT coefficient matrix when said first one-dimensional IDCT is carried out, and said transposed element of the IDCT kernel when said second one-dimensional IDCT is carried out, as a second multiplicand, and said element of the IDCT kernel outputted from said IDCT kernel storing means as a second multiplier;
  a first accumulating means accumulating an output of said first multiplying means to generate elements for a first and fifth row of said one-dimensional IDCT coefficient matrix when said first one-dimensional IDCT is carried out, and to generate elements for a first and fifth row of said transposed two-dimensional IDCT coefficient matrix when said second one-dimensional IDCT is carried out;
  a second accumulating means accumulating an output of said first multiplying means to generate elements for a fourth and eighth row of said one-dimensional IDCT coefficient matrix when said first one-dimensional IDCT is carried out, and to generate elements for a fourth and eighth row of said transposed two-dimensional IDCT coefficient matrix when said second one-dimensional IDCT is carried out;
  a third accumulating means accumulating an output of said first multiplying means to generate elements for a second and sixth row of said one-dimensional IDCT coefficient matrix when said first one-dimensional IDCT is carried out, and to generate elements for a second and sixth row of said transposed two-dimensional IDCT coefficient matrix when said second one-dimensional IDCT is carried out;
  a fourth accumulating means accumulating an output of said first multiplying means to generate elements for a third and seventh row of said one-dimensional IDCT coefficient matrix when said first one-dimensional IDCT is carried out, and to generate elements for a third and seventh row of said transposed two-dimensional IDCT coefficient matrix when said second one-dimensional IDCT is carried out; and
  transposing means storing said one-dimensional IDCT coefficient matrix or said transposed two-dimensional IDCT coefficient matrix outputted from said first to fourth accumulating means, and transposing said one-dimensional IDCT coefficient matrix or said two-dimensional IDCT coefficient matrix to output the transposed matrix to said first and second multiplying means.

7. The inverse discrete cosine transforming apparatus according to claim 6, wherein said first multiplying means includes:
  a first register storing said element of the IDCT coefficient matrix when said first one-dimensional IDCT is carried out, and storing said element of the transposed one-dimensional IDCT coefficient matrix when said second one-dimensional IDCT is carried out;
  a second register storing said element of the IDCT kernel outputted from said IDCT kernel storing means; and
  a first multiplier multiplying the values stored in said first and second registers.

8. The inverse discrete cosine transforming apparatus according to claim 6, wherein said second multiplying means includes:
  a third register storing said element of the IDCT coefficient matrix when said first one-dimensional IDCT is carried out, and storing said element of the transposed one-dimensional IDCT coefficient matrix when said second one-dimensional IDCT is carried out;
  a fourth register storing said element of the IDCT kernel outputted from said IDCT kernel storing means; and
  a second multiplier multiplying the values stored in said third and fourth registers.

9. The inverse discrete cosine transforming apparatus according to claim 6, wherein said first accumulating means includes:
  a fifth and sixth register;
  a seventh register receiving output of said first multiplying means;
  a first multiplexor selectively outputting data stored in said sixth and seventh registers; and
  a first accumulator receiving output of said first multiplexor and data stored in said fifth register, and selectively feeding back to said fifth or sixth register.

10. The inverse discrete cosine transforming apparatus according to claim 6, wherein said second accumulating means includes:
  a eighth and ninth register;
  a tenth register receiving output of said first multiplying means;
  a second multiplexor selectively outputting data stored in said ninth and tenth registers; and
  a second accumulator receiving output of said second multiplexor and data stored in said eighth register, and selectively feeding back to said eighth or ninth register.

11. The inverse discrete cosine transforming apparatus according to claim 6, wherein said third accumulating means includes:
  a eleventh and twelfth register;
  a thirteenth register receiving output of said second multiplying means;

a third multiplexor selectively outputting data stored in said twelfth and thirteenth registers; and a third accumulator receiving output of said third multiplexor and data stored in said eleventh register, and selectively feeding back to said eleventh or twelfth register.

12. The inverse discrete cosine transforming apparatus according to claim 6, wherein said fourth accumulating means includes:

a fourteenth and fifteenth register;

a sixteenth register receiving output of said second multiplying means;

a fourth multiplexor selectively outputting data stored in said fifteenth and sixteenth registers; and a fourth accumulator receiving output of said fourth multiplexor and data stored in said fourteenth register, and selectively feeding back to said fourteenth or fifteenth register.

13. The inverse discrete cosine transforming apparatus according to claim 6, wherein each element of said one-dimensional IDCT coefficient matrix is composed of 16 bits, and each element of said transposed two-dimensional IDCT coefficient matrix is composed of 9 bits.

14. The inverse discrete cosine transforming apparatus according to claim 6, wherein elements of even-indexed rows of said transposed DCT coefficient matrix and of said one-dimensional IDCT matrix are applied to said first and second multiplying means prior to elements of odd-indexed rows.

15. The inverse discrete cosine transforming apparatus according to claim 6, wherein elements of odd-indexed rows of said transposed DCT coefficient matrix and of said one-dimensional IDCT coefficient matrix are stored in said first and second multiplying means for over twice longer than in the case of the elements of even-indexed rows.

16. The inverse discrete cosine transforming apparatus according to claim 6, wherein said multiplying means receive said absolute value of the element of said IDCT kernel matrix, give a negative or positive sign to said absolute value during a multiplication step.

17. The inverse discrete cosine transforming apparatus according to claim 6, wherein said elements of the DCT coefficient matrix are applied to said second multiplying means with a predetermined delay time when said first one-dimensional IDCT is carried out.

18. An inverse discrete cosine transforming apparatus in an MPEG decoder for transforming N×N matrix data block comprising:

a first multiplexor receiving a DCT coefficient matrix and a transposed one-dimensional IDCT coefficient matrix, and outputting said DCT coefficient matrix when a one-dimensional IDCT is carried out and said transposed one-dimensional IDCT coefficient matrix when a second one-dimensional IDCT;

an IDCT kernel storing means storing value of an IDCT kernel, and being applied an element of a DCT coefficient matrix or transposed one-dimensional IDCT coefficient matrix to output said IDCT kernel corresponding to the index of said element;

a delaying means delaying the elements of said DCT coefficient matrix or of said transposed one-dimensional IDCT coefficient matrix outputted from said first multiplexor;

a first multiplying means including a first register, a second register, and a multiplier, wherein said first register stores said element of the IDCT coefficient matrix when said first one-dimensional IDCT is carried out, and stores said element of the transposed one-dimensional IDCT coefficient matrix when said second one-dimensional IDCT is carried out, wherein said second register stores said element of the IDCT kernel outputted from said IDCT kernel storing means, wherein said multiplier multiplies the values stored in said first and second registers;

a second multiplying means including a third register, a fourth register, and a second multiplier, wherein said third register stores said element of the IDCT coefficient matrix when said first one-dimensional IDCT is carried out, and stores said element of the transposed one-dimensional IDCT coefficient matrix when said second one-dimensional IDCT is carried out, wherein said fourth register stores said element of the IDCT kernel outputted from said IDCT kernel storing means, wherein said second multiplier multiplies the values stored in said third and fourth registers;

a first accumulating means including a fifth and sixth register, a seventh register receiving output of said first multiplying means, a first multiplexor selectively outputting data stored in said sixth and seventh registers, and a first accumulator receiving output of said first multiplexor and data stored in said fifth register and selectively feeding back to said fifth or sixth register;

a second accumulating means including a eighth and ninth register, a tenth register receiving output of said first multiplying means, a second multiplexor selectively outputting data stored in said ninth and tenth registers, and a second accumulator receiving output of said second multiplexor and data stored in said eighth register and selectively feeding back to said eighth or ninth register;

a third accumulating means including a eleventh and twelfth register, a thirteenth register receiving output of said second multiplying means, a third multiplexor selectively outputting data stored in said twelfth and thirteenth registers, and a third accumulator receiving output of said third multiplexor and data stored in said eleventh register and selectively feeding back to said eleventh or twelfth register;

a fourth accumulating means including a fourteenth and fifteenth register, a sixteenth register receiving output of said second multiplying means, a fourth multiplexor selectively outputting data stored in said fifteenth and sixteenth registers, and a fourth accumulator receiving output of said fourth multiplexor and data stored in said fourteenth register and selectively feeding back to said fourteenth or fifteenth register;

a transposing means storing said accumulated data from the first to fourth accumulators in a matrix form and transposing said stored data; and a demultiplexor supplying said one-dimensional IDCT coefficient matrix to said multipliers and said two-dimensional IDCT coefficient matrix to an external device;

demultiplexor receiving said output of the transposing means, and outputting the received data to said first multiplexor for said transposed one-dimensional IDCT coefficient matrix when said first one-dimensional IDCT is completed and outputting the received data to said first multiplexor for a two-dimensional IDCT coefficient when said second one-dimensional IDCT is completed.

19. The inverse discrete cosine transforming apparatus according to claim 18, wherein the delaying time of said delaying means is equal to or longer than the time spent in storing elements of said one-dimensional IDCT coefficient matrix or said transposed two-dimensional IDCT coefficient matrix in said transposing means.

20. The inverse discrete cosine transforming apparatus according to claim 18, wherein each element of said one-dimensional IDCT coefficient matrix is composed of 16 bits, and each element of said transposed two-dimensional IDCT coefficient matrix is composed of 9 bits.

21. The inverse discrete cosine transforming apparatus according to claim 18, wherein elements of even-indexed rows of said transposed DCT coefficient matrix and of said one-dimensional IDCT matrix are applied to said first and second multiplying means prior to elements of odd-indexed rows.

22. The inverse discrete cosine transforming apparatus according to claim 18, wherein elements of odd-indexed rows of said transposed DCT coefficient matrix and of said one-dimensional IDCT coefficient matrix are stored in said first and second multiplying means for over twice longer time than in the case of the elements of even-indexed rows.

23. The inverse discrete cosine transforming apparatus according to claim 18, wherein said multiplying means receive said absolute value of the element of said IDCT kernel matrix, give a negative or positive sign to said absolute value during a accumulation stage.

* * * * *